US011504932B2

(12) United States Patent
Klopp

(10) Patent No.: US 11,504,932 B2
(45) Date of Patent: Nov. 22, 2022

(54) DIE INSERTION TOOL

(71) Applicant: BAYER HEALTHCARE LLC, Whippany, NJ (US)

(72) Inventor: Michael Klopp, Pine Grove, PA (US)

(73) Assignee: BAYER HEALTHCARE LLC, Whippany, NJ (US)

( * ) Notice: Subject to any disclaimer, the term of this patent is extended or adjusted under 35 U.S.C. 154(b) by 382 days.

(21) Appl. No.: 15/733,144

(22) PCT Filed: Nov. 27, 2018

(86) PCT No.: PCT/US2018/062515
§ 371 (c)(1),
(2) Date: May 28, 2020

(87) PCT Pub. No.: WO2019/108498
PCT Pub. Date: Jun. 6, 2019

(65) Prior Publication Data

US 2020/0346425 A1 Nov. 5, 2020

Related U.S. Application Data

(60) Provisional application No. 62/677,420, filed on May 29, 2018, provisional application No. 62/592,657, filed on Nov. 30, 2017.

(51) Int. Cl.
*G06F 9/445* (2018.01)
*G06F 9/455* (2018.01)
*G06F 9/44* (2018.01)
*B22F 3/03* (2006.01)
*B30B 11/00* (2006.01)
*B30B 15/02* (2006.01)
*B30B 11/08* (2006.01)

(52) U.S. Cl.
CPC ............ *B30B 15/026* (2013.01); *B30B 11/08* (2013.01)

(58) Field of Classification Search
CPC .............................. B30B 15/026; B30B 11/08
See application file for complete search history.

(56) References Cited

U.S. PATENT DOCUMENTS 11,285,535 B2 * 3/2022 Sterkenburg .......... B30B 11/007

* cited by examiner

*Primary Examiner* — Thuy Dao
(74) *Attorney, Agent, or Firm* — Morrison & Foerster LLP

(57) ABSTRACT

The invention concerns a die insertion tool (100) for inserting a die (550) into a die pocket (552) of a press (500), the tool (100) includes a barrel (102) shaped for positioning the tool (100) within a punch guide bore (582) of the press (500), a tip (106) for insertion into a die cavity (556) of the die (550), and a collar (104) located between the barrel (102) and the tip (106) and configured to contact the die (550) when the tip (106) is inserted in the die cavity (556). The invention further concerns a kit (700) for a press (500) and a method for inserting a die (550) into a die pocket (552) of a press (500).

17 Claims, 10 Drawing Sheets

DIE INSERTION TOOL

FIELD OF THE INVENTION

The invention relates to compression machines and, more specifically, to a die insertion tool and methods of inserting a die into a press.

BACKGROUND OF THE INVENTION

A compression machine compresses granulation into objects of uniform size and weight. A press can be used to manufacture objects of a wide variety of materials, including pharmaceuticals, cleaning products, and cosmetics. To form an object in a compression machine, granulated material is metered into a cavity formed by two punches and a die. The punches are then pressed together within the die to fuse the material together. Generally, punches and dies are tailored to each product in order to achieve the desired size and shape of the product. A press can be configured for manufacturing a particular product by tooling the press with the appropriate punches and dies. Die to punch alignment is critical to the compression process and must be accurately set during tooling.

Conventionally, dies are inserted in die tables using a multi-step process during which the die can become misaligned. In a conventional process, a die is positioned over a die pocket, a working upper punch is inserted into the upper punch guide bore, and the die is shifted around until the tip of the working upper punch inserts in the die cavity. This aligns the die to the punch. The upper punch is then removed and replaced by a rod that is struck against the top of the die until the die is fully inserted in the die pocket. The rod is then removed and the working upper punch is reinserted to check die alignment. At any point after the upper punch is removed, the die may rotate slightly and be misaligned. If the die is misaligned, the die is tapped back out and the insertion process is repeated.

SUMMARY OF THE INVENTION

According to some embodiments, a die insertion tool can be used to accurately align and insert a die in a die pocket of a press while maintaining positive engagement between the die insertion tool and the die. By maintaining positive engagement, proper alignment of the die is maintained during insertion of the die in the die pocket. In some embodiments, the die insertion tool is configured and dimensioned to fit in a press in place of an upper punch of the press. By being configured to fit in place of the upper punch during die insertion, the die insertion tool can ensure that the alignment of the die is accurately maintained. Proper die alignment can result in less die wear, punch tip wear, turret damage, and in better formed products.

According to some embodiments, a die insertion tool includes a barrel, shaped for positioning the tool within a punch bore of a press, a tip for insertion into a die cavity of a die that is aligned over a die pocket, and a collar located between the barrel and the tip and configured to contact the die when the tip is inserted in the die cavity of the die. In some embodiments, a driving rod, which may be integrated into the die insertion tool or may be separate, can be moved vertically by the user to strike the end of the bore. The striking force is translated to the die via the collar. While the striking force is applied to seat the die in the die pocket, the tip of the tool maintains positive engagement with the die to ensure that the alignment of the die is maintained throughout the insertion process.

According to some embodiments, a die insertion tool for inserting a die into a die pocket of a press includes a barrel shaped for positioning the tool within a punch guide bore of the press, a tip for insertion into a die cavity of the die, and a collar located between the barrel and the tip and configured to contact the die when the tip is inserted in the die cavity.

In any of these embodiments, the tip may be shaped to fit a shape of the die cavity. In any of these embodiments, the barrel may be shaped to match a shape of an upper punch that is configured for use with the die.

In any of these embodiments, the tool may further include a key extending from a side of the barrel for rotationally positioning the barrel within the punch bore about a longitudinal axis of the punch bore.

In any of these embodiments, the tip may have a noncircular profile. In any of these embodiments, the tip may be exchangeable.

In any of these embodiments, the tool may further include a driving rod slideably positioned in a bore of the barrel and the driving rod may be configured to drive against an end of the bore for applying an insertion force to the die through the collar.

In any of these embodiments, the driving rod may extend from an end of the barrel when the driving rod contacts the end of the bore. In any of these embodiments, an end portion of an outer surface of the barrel may have a rougher texture than an adjacent portion of the outer surface of the barrel. In any of these embodiments, the end portion may be knurled.

In any of these embodiments, the tool may include a member that extends into or through a longitudinal slot in the driving rod to retain the driving rod in the bore during use. In any of these embodiments, a key may extend from a side of the barrel for rotationally positioning the barrel within the punch bore and the member may be configured to affix the key to the barrel.

According to some embodiments, a kit for a press may include at least one die for the press and a die insertion tool that includes: a barrel shaped for positioning the tool within a punch bore of the press, a tip for insertion into a die cavity of the at least one die, and a collar located between the barrel and the tip and configured to contact the at least one die when the tip is inserted in the die cavity.

In any of these embodiments, the kit may further include at least one upper punch for the press. In any of these embodiments, at least a portion of the barrel of the die insertion tool may be shaped to match a corresponding portion of a barrel of the at least one upper punch. In any of these embodiments, at least a portion of the tip of the die insertion tool may be shaped to match a corresponding portion of a tip of the at least one upper punch.

In any of these embodiments, the kit may further include at least one lower punch for the press.

In any of these embodiments, the die insertion tool may further include a key extending from a side of the barrel for rotationally positioning the barrel within the punch bore about a longitudinal axis of the punch bore.

In any of these embodiments, the kit may further include a driving rod slideably positioned in a bore of the barrel and the driving rod may be configured to drive against an end of the bore for applying an insertion force to the at least one die through the collar According to some embodiments, a method for inserting a die into a die pocket of a press may include positioning the die over the die pocket, sliding a barrel of a die insertion tool into an upper punch bore of the press, inserting a tip of the die insertion tool into a cavity of the die until a collar of the die insertion tool rests against the die, and striking against the barrel so that the collar exerts an insertion force on the die to seat the die within the die pocket.

In any of these embodiments, the method may further include applying a torque to the barrel about a longitudinal axis of the barrel while driving the rod against the barrel.

In any of these embodiments, the die pocket may be a die pocket of a rotary press and the torque may be applied in a direction of rotation of the die table in use.

In any of these embodiments, sliding the die insertion tool into the upper punch bore of the press may include orienting the die insertion tool so that a key of the die insertion tool fits in a keyway in the upper punch bore.

In any of these embodiments, the barrel may be repeatedly struck to seat the die in the die pocket.

In any of these embodiments, the upper punch bore may be located in a turret of the press and the method may be performed while the turret is disassembled from the press.

In any of these embodiments, the method may further include, prior to positioning the die over the die pocket, removing the turret from the press in preparation for inserting the die into a die pocket of the press. In any of these embodiments, removing the turret from the press may include removing an upper punch from the upper punch bore of the press.

In any of these embodiments, the die insertion tool may include a driving rod slideably positioned within the barrel of the tool, and striking against the barrel may include driving the driving rod against the barrel so that the collar exerts an insertion force on the die to seat the die within the die pocket.

According to some embodiments, a tool for aligning a die to a die pocket of a press includes a main body that includes a wall having a cylindrical inner surface that defines a passage for receiving the die, a bore extending through the wall, and a shoulder extending inwardly of an outer diameter of the bore, and a die engaging pin slidably positioned in the bore, the die engaging pin comprising a head portion for receiving an external force and a pin portion extending from the head portion, the pin portion having a tip that is configured to push a die against the cylindrical inner surface when the die is located within the passage, wherein an engagement between the head portion and an outer surface of the wall resists inward movement of the die engaging pin in the bore and an engagement between the shoulder of the main body and a recess of the pin portion resists outward movement of the die engaging pin in the bore.

In any of these embodiments, the main body may include a resilient band that extends circumferentially around the wall and the shoulder may be a portion of the resilient band. In any of these embodiments, the die engaging pin may be biased inwardly by the resilient band. In any of these embodiments, the resilient band may be located in a circumferential groove. In any of these embodiments, the tip of the pin portion may protrude into the passage when the head portion is engaged with the outer surface of the wall.

BRIEF DESCRIPTION OF THE DRAWINGS

The invention will now be described, by way of example only, with reference to the accompanying drawings, in which.

DETAILED DESCRIPTION OF EXEMPLARY EMBODIMENTS

Figure 1:
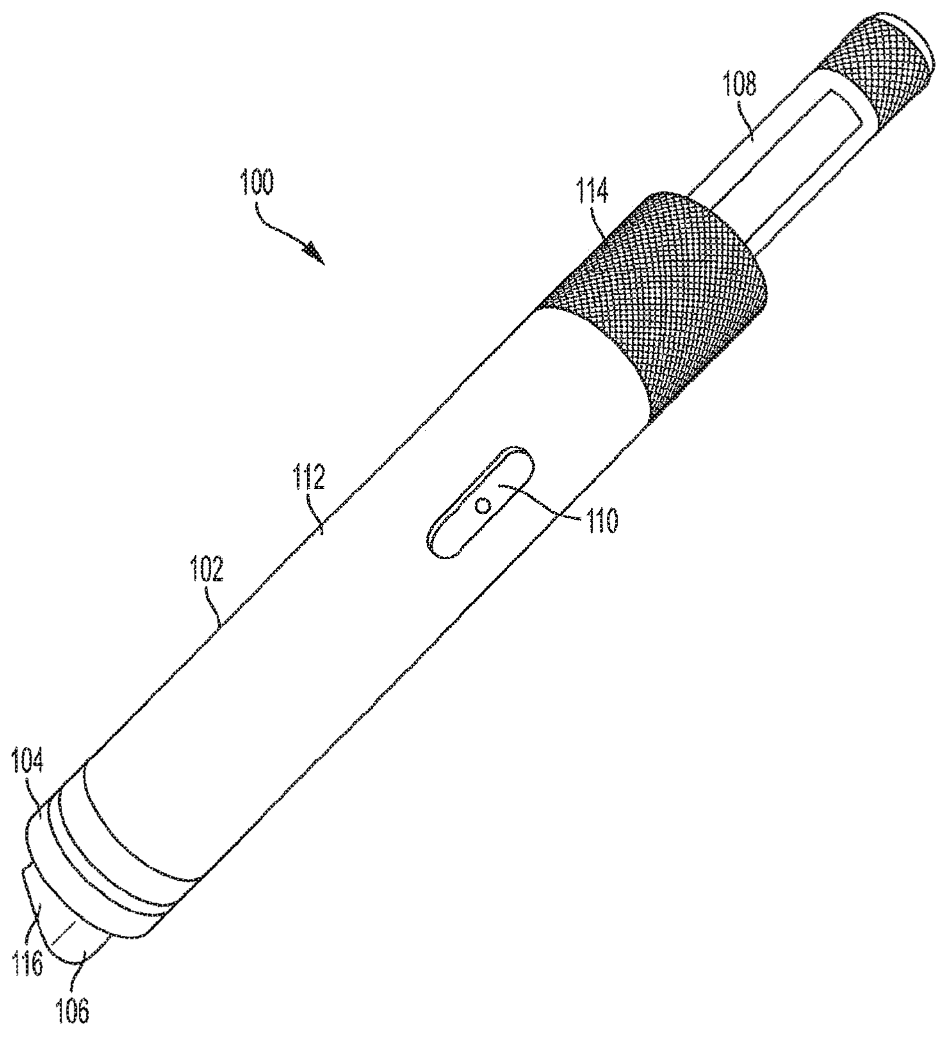
FIG. 1 is a perspective view of a die insertion tool, according to an embodiment.

Described herein are die insertion tools, kits, and methods for accurately aligning and inserting a die in a die pocket of a press. A die insertion tool, according to some embodiments, can maintain constant engagement with the die during the insertion process, ensuring that the die maintains its alignment. According to some embodiments, a die insertion tool includes a barrel shaped for positioning the tool within a punch bore of a press, a tip for insertion into a die cavity of a die that is aligned over a die pocket, and a collar located between the barrel and the tip and configured to contact the die when the tip is inserted in the die cavity of the die. A driving rod, which may be integrated into the die insertion tool or may be separate, can be used to strike against an end of the bore. The striking force is translated to the die via the collar. While the striking force is applied to seat the die in the die pocket, the tip of the tool maintains positive engagement with the die pocket to ensure that the alignment of the die is maintained during insertion.

Die insertion tools, methods, and kits, according to the principles described herein can provide improved die insertion by maintaining the positive engagement between an alignment feature and the die throughout the insertion process. Better die alignment achievable using the tools, kits, and methods described herein can result in less die wear, punch tip wear, turret damage, and in better formed products.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

FIGS. 1-4 illustrate a die insertion tool 100, according to some embodiments. The die insertion tool 100 is configured to accurately insert a die into a die pocket while maintaining positive engagement between the tool and the die cavity throughout the insertion process to ensure that the die is seated in the pocket in the correct orientation. Since tooling for a press is tailored to the specific product application to produce the desired shape and size of the product, a die insertion tool is generally configured according to a specific configuration of tooling. Die insertion tool 100 is an exemplary configuration and a person of skill in the art will readily understand from the principles described herein how to configure a die insertion tool to a specific application.

Die insertion tool 100 includes a barrel 102, a collar 104, a tip 106, and a driving rod 108. The barrel 102 provides the main body of the tool and includes a first portion 112 that is configured to slide into an upper punch guide bore of a press and an upper portion 114 that is configured to extend out of the punch guide when the tool is inserted into the punch guide during use. The barrel 102 may be shaped and dimensioned according to the particular tooling for which the die insertion tool is configured.

The first portion 112 may be cylindrical in form and may serve as a bearing surface for registering against the guide bore to ensure proper alignment of the tool within the guide bore. The first portion 112 may be configured to match a working punch such that it registers to the guide bore as would the working punch, which ensures that the tool inserts the die in the proper orientation for use with the working punch. The first portion 112 may have a low roughness surface finish to ensure smooth movement within the guide bore. The upper portion 114 may include a textured surface, such as a knurled surface, that is rougher than the lower portion of the barrel to aid a user's grip during use of the tool, as described further below. In some embodiments, the upper portion may include a rubber sleeve over the barrel to provide a textured surface. The upper portion 114 may take any suitable form and need not be cylindrical.

Figure 3:
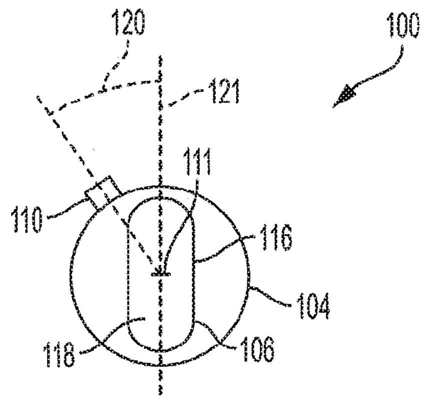
FIG. 3 is an end view of a die insertion tool, showing the orientation of a key with respect to a tip according to an embodiment.

The barrel 102 may include a key 110 extending from the side of the barrel. The key 110 may be configured to slide into a keyway in the upper punch guide bore of the press to ensure that the tip 106 is oriented in the same manner as the tip of a working punch. As illustrated in FIG. 3, the key may be positioned in accordance with a predefined orientation about a longitudinal axis 111 of the barrel 102 with respect to the tip (e.g., with a predefined angle 120 about the longitudinal axis 111). The predefined angular orientation may match the orientation of a working punch key to a working punch tip, which may ensure that the die is inserted in the proper angular orientation for use with a working punch.

The barrel 102 may be configured according to predefined standard sizes. For example, tooling for rotary presses may come in multiple standard sizes and barrel 102 may be configured according to a standard size. Examples of standard tooling sizes are size "B" in which the nominal diameter of the punch barrel is 0.75 inches and size "D" in which the nominal diameter of the punch barrel is 1 inch.

Tip 106 is configured for inserting into a die cavity of a working die. The shape of the tip 106 may match the shape of a die cavity. In some embodiments, the tip 106 may be shaped and dimensioned to closely match the shape and dimensions of a working punch tip associated with a given die such that the tip 106 fits within the die in the same manner as the working punch tip. In other words, the profile of the tip 106 may match the profile of the die cavity with a predefined clearance. For example, the tip 106 may be dimensioned to provide a clearance between the side surface 116 of the tip 106 and the walls of the die cavity that is within a predefined tolerance for the clearance between the die and a working punch tip.

Die cavities are shaped and sized according to the configuration of the particular product application, and therefore, the tip 106 may be formed according to the particular die configuration. The tip 106 may be any suitable size and any suitable shape, including a circular shape or a non-circular shape such as a capsule shape (as shown in FIG. 3), a triangle, an oval, a rectangle, a square, a diamond, etc., and any suitable. In some embodiments, the tip may be a multi-component tip for use with a multi-cavity die.

For on-circular and/or multi-component tips, the tip may be oriented about the longitudinal axis 111 of the barrel 102 with respect to the key 110 according to a predefined orientation and based on a feature of the non-circular tip. For example, for the tip configuration illustrated in FIG. 3, the predefined angular orientation may be the angle 120 between a lengthwise midline 121 of the tip to a line extending midway through the key 110 from the intersection of the longitudinal axis 111 with the midline 121. This angle 120 may be any angle so long as it matches the corresponding angle of the associated working punch.

The length of the tip 106 may match the length of a working punch tip or may be shorter or longer. The end face 118 of the tip 106 can take any form and need not be configured to match the configuration of the end face of a working punch tip.

Collar 104 is located between the barrel 102 and the tip 106. The collar 104 is configured for contacting an end face of the die to impart the insertion force to the die, as described in more detail below. The collar 104 may be made of a softer material than the die to prevent the collar from marring the surface of the die during the insertion process. For example, the collar may be formed from an FDA approved plastic such as Delrin or from any other suitable material.

Figure 2:
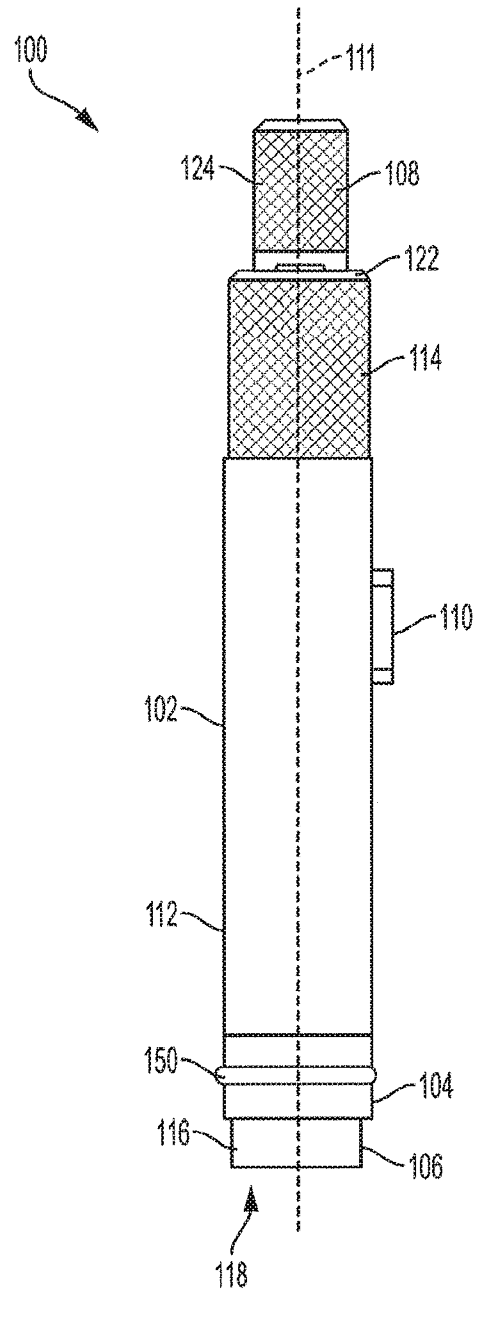
FIG. 2 is a side view of the die insertion tool of FIG. 1.

In the embodiment of FIG. 1, driving rod 108 is integrated within the insertion tool and is slideably positioned within a bore of barrel 102. FIG. 1 illustrates the driving rod 108 in an extended position with respect to the barrel 102 and FIG. 2 illustrates the driving rod 108 in a fully retracted position. In the fully retracted position, the driving rod 108 extends outwardly beyond the upper end 122 of the barrel 102. In the illustrated embodiment, a portion of the driving rod 108 includes a textured surface 124, such as a knurled surface, for easier gripping by a user. As explained further below, the driving rod 108 is repeatedly struck against an end of the bore in which it slides while the collar 104 rests against a die that is positioned over a die pocket. The striking force is transferred to the die through the collar 104, which forces the die into the die pocket in the die table.

Figure 4:
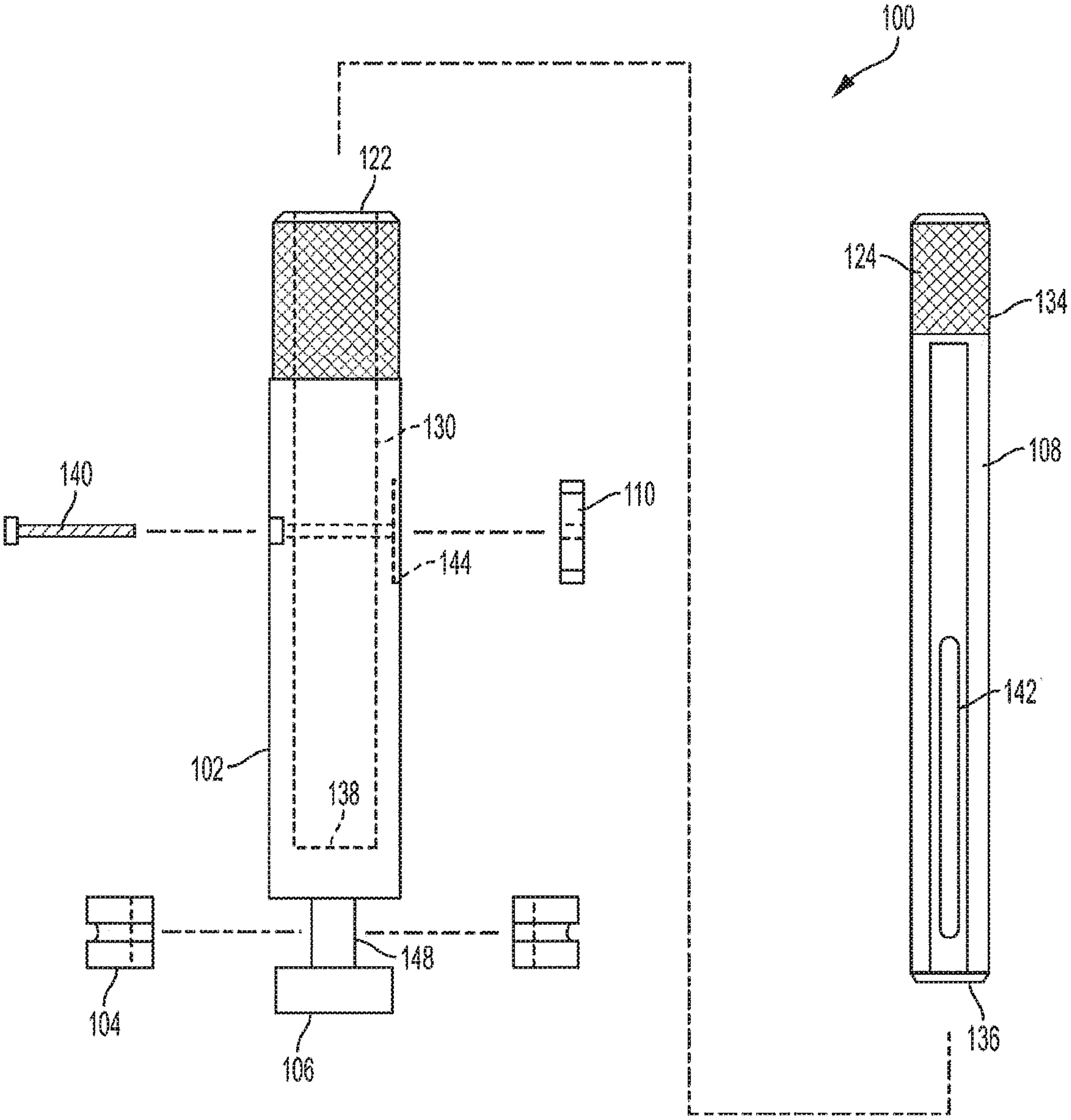
FIG. 4 is an exploded view of a die insertion tool, according to an embodiment.

FIG. 4 is an exploded view showing the assembly of die insertion tool 100, according to some embodiments. Barrel 102 includes a bore 130 that extends from the upper end 122 of the barrel 102. The driving rod 108 slides into the bore 130 and rests against a lower end 138 of the bore 130. The length of driving rod 108 is greater than the length of the bore so that an end 134 of the driving rod 108 extends beyond the barrel 102 when the opposite end 136 of the driving rod 108 is contacting the lower end 138 of the bore 130.

Once the driving rod 108 is inserted into the bore 130, a driving rod retention member 140 may be provided to retain the driving rod 108 in the bore 130. Retention of the driving rod 108 in the bore 130 may be advantageous to prevent a user from fully withdrawing the driving rod as the user slides the driving rod back and forth in the bore during use. In the example illustrated in FIG. 4, the retention member 140 is in the form of a fastener that is inserted through a side of the barrel 102 and through a slot 142 that runs partway along the length of the driving rod 108 such that the driving rod 108 can slide along the bore 130 but cannot be removed without removing the fastener. The driving rod retention member may take any other suitable form, such as a spring loaded tab or a set screw that extends partway into a groove in the driving rod 108. In some embodiments, no retention member is provided such that the driving rod 108 can be fully withdrawn from the bore 130.

The retention member 140 may be used to fasten the key 110 to the side of the barrel 102, for example, by threading the retention member 140 into the key 110. The key 110 may be attached to the side of the barrel 102 via any other suitable method, including by welding or gluing. The key may fit within a key pocket 144 in the side of the barrel 102, which may provide an alignment feature to ensure that the key 110 is accurately angularly oriented about the longitudinal axis 111 of the barrel 102 with respect to tip 106. In some embodiments, the key 110 is formed along with the barrel 102 from a single block of material.

Tip 106 is positioned at the end of a neck 148 extending from an end of the barrel 102. In some embodiments, the barrel, the neck, and the tip are formed as a single piece of material. In some embodiments, the tip is a separate piece or a part of a separate piece that is permanently or removeably attached to the neck or the barrel. In some embodiments, the tip of an insertion tool may be an exchangeable tip that can be removed and replaced with another tip. This may allow for tips of different configuration to be swapped for use with dies of different configuration. An exchangeable tip may thread onto the neck or may be integrated with the neck and the neck may thread onto the barrel.

The collar 104 may be formed from two pieces that fit around the neck 148. The two pieces of the collar may be held together with an o-ring 150 (see FIG. 2) or by using any other suitable such fastening method, such as by using fasteners, by gluing, etc.

FIGS. 5A-5D illustrate the use of a die insertion tool, such as die insertion tool 100, for inserting a die 550 into a die table 580 of a press 500 according to one embodiment. Press 500 may be a single punch press or a rotary press, such as a press suitable for use in the pharmaceutical industry, or for use in the production of a variety of different products, including vitamins, pet food, detergents, explosives, ceramics, batteries, balls, bearings, nuclear fuels, etc. For example, a die insertion tool, according to some embodiments, may be used to insert dies into a Fette Compacting 3090i Double Rotary Press.

Figure 5A:
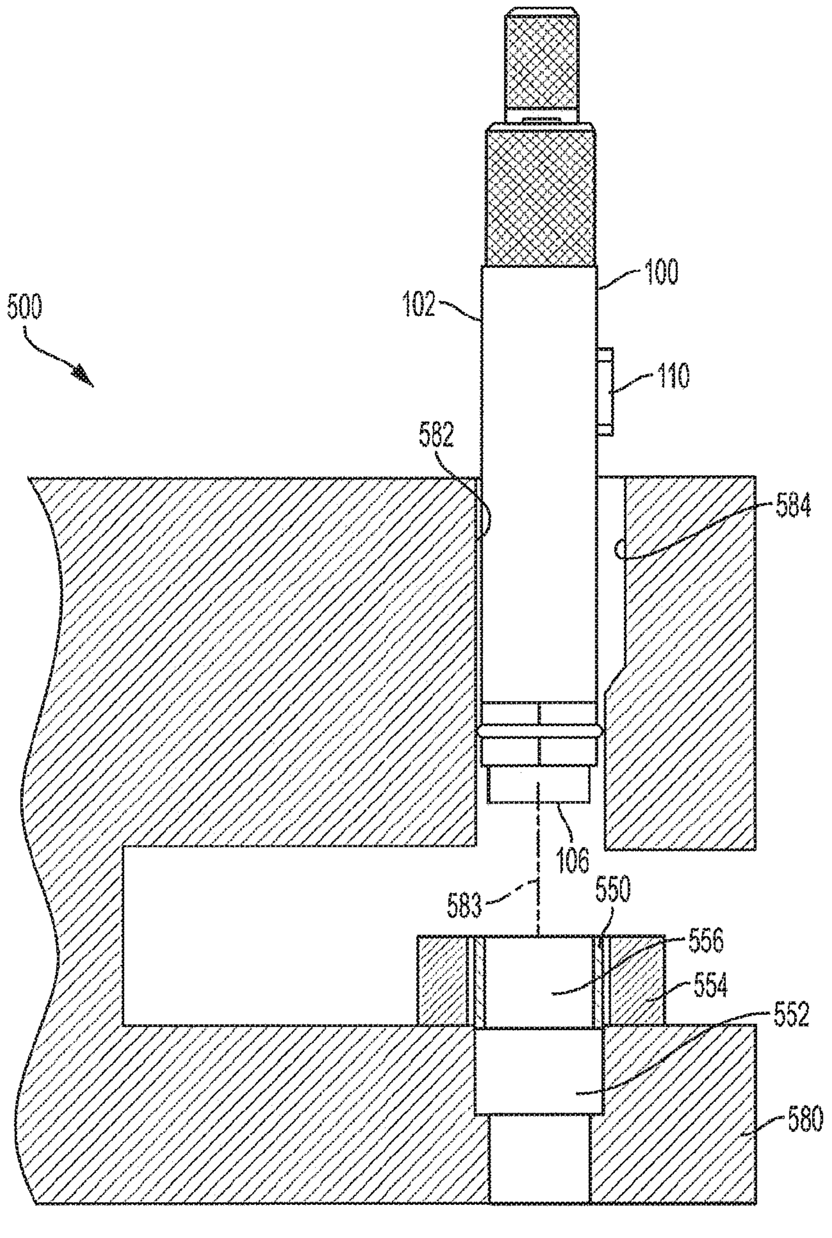
FIG. 5A shows the insertion of a die insertion tool into a punch guide bore of a press, according to some embodiments.

As shown in FIG. 5A, a die 550 is positioned over a die pocket 552 of a die table 580. Die table 580 may be a portion of a turret of a rotary press. The die 550 may be positioned over the die pocket 552 using a die insertion ring 554, which may ensure that the die 550 is oriented vertically. Depending on the design of the die pocket and the die, the die may slide partway into the die pocket if there is sufficient clearance. Generally, the die and die pocket are configured for an interference fit to ensure that the die maintains a constant position during use. Accordingly, a force is applied to the die by a user through the die insertion tool 100 to force the die into the die pocket.

Figure 5B:
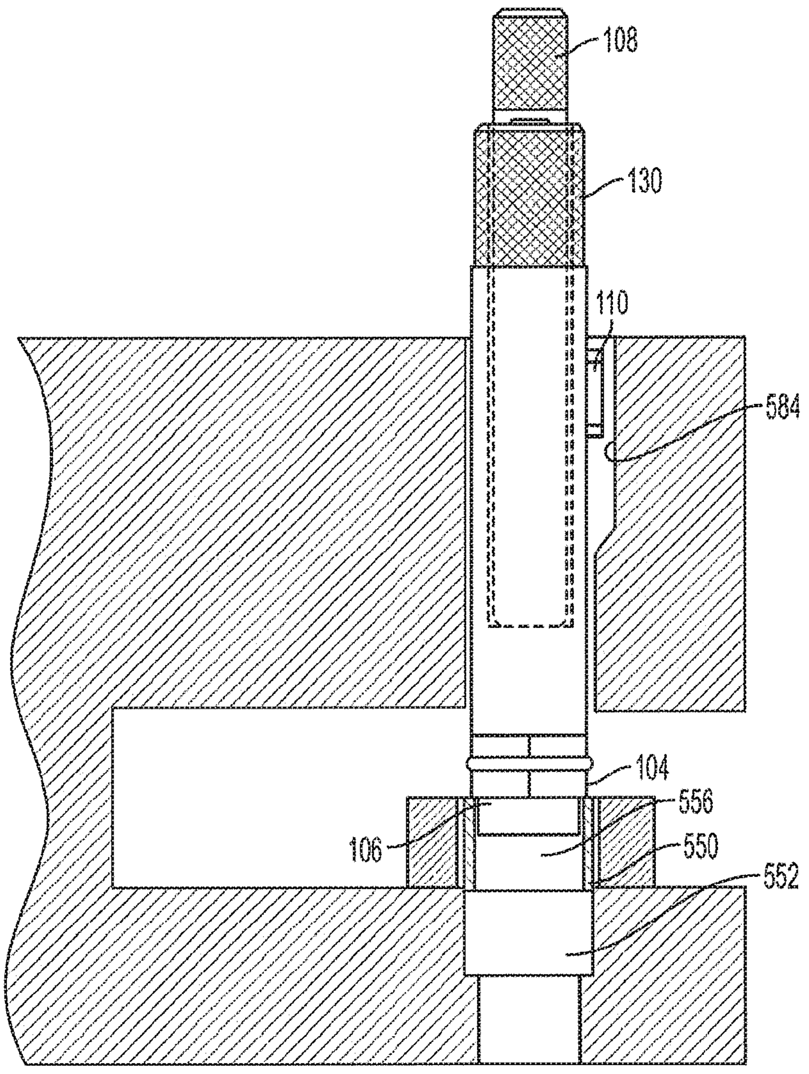
FIG. 5B shows the engagement of a die insertion tool with a die, according to some embodiments.

The die insertion tool 100 is inserted into the upper punch guide bore 582 from above such that the key 110 fits into the keyway 584 of the guide bore 582. Fitting of the key 110 into the keyway 584, ensures that the die insertion tool 100 is properly oriented about a longitudinal axis 583 of the guide bore 582. The die insertion tool is moved downward within the upper punch guide bore 582 until the tip 106 is inserted into the die cavity 556 of the die 550 and the collar 104 rests against an upper end of the die 550, as shown in FIG. 5B. The user may need to rotate the die 550 about its vertical axis or translate the die along the die table 580 to align the die cavity 556 with the tip 106 before the tip 106 can be inserted into the die cavity 556.

Figure 5C:
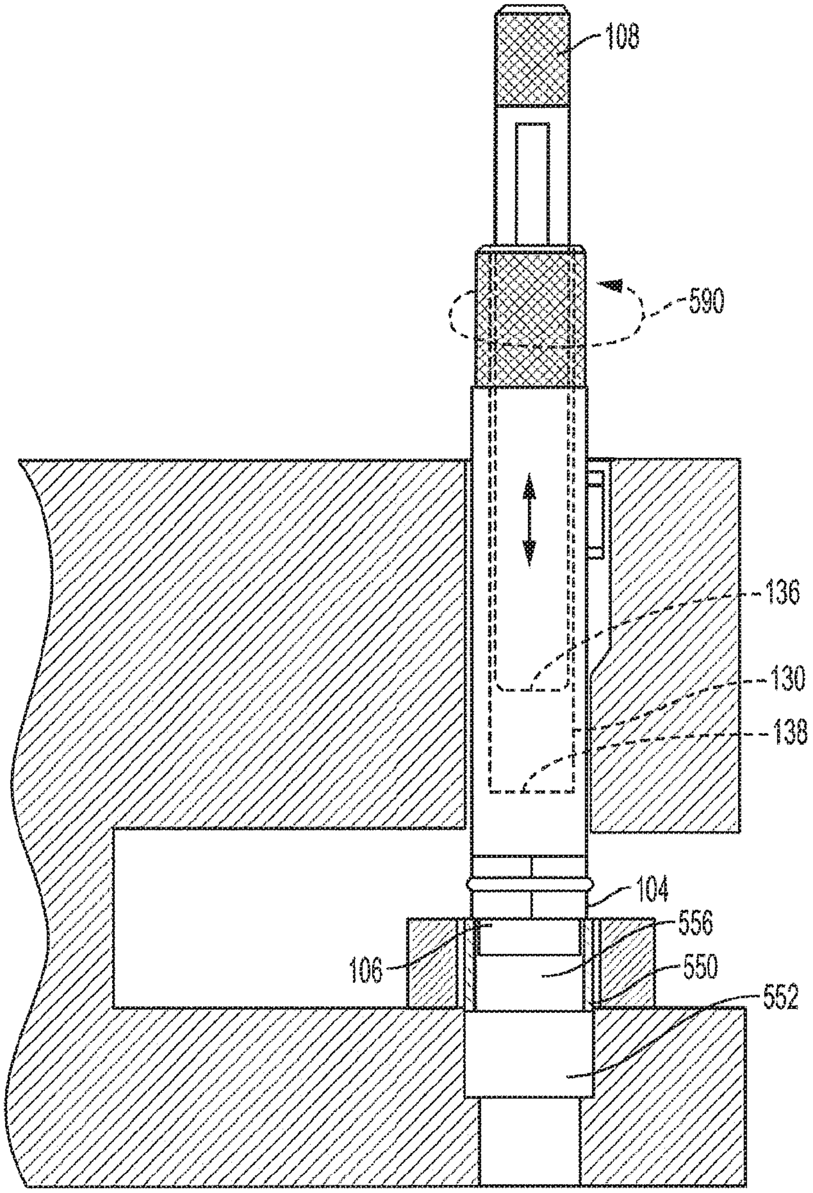
FIG. 5C shows the withdrawal of a driving rod from the barrel of a die insertion tool for striking, according to some embodiments.
Figure 5D:
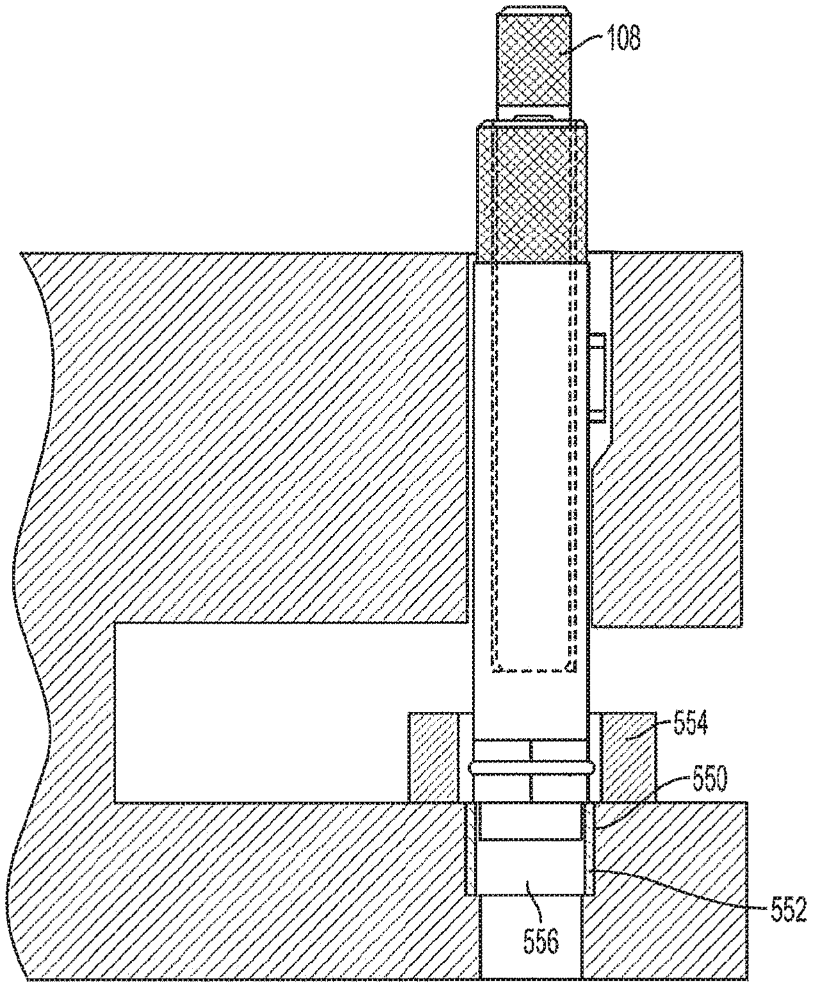
FIG. 5D shows a die that has been inserted into a die pocket using a die insertion tool, according to some embodiment.

As shown in FIG. 5C, the user moves the driving rod 108 upward within the bore 130. The user then moves the driving rod 108 downward, striking the driving rod 108 against the lower end 138 of the bore 130. The strike force is transferred through the collar 104 to the die 550, which causes the die to move into or further into the die pocket 552. The user may repeat the striking operation until the die 550 is fully seated in the die pocket 552, as shown in FIG. 5D. The user may then withdraw the die insertion tool from the upper punch guide bore. The die insertion ring 554 may be moved over the die pocket to ensure that the die 550 does not extend above the upper end of the die pocket 552, which may indicate that the die is fully seated in the pocket. If the die table includes additional die pockets, the die insertion operation may be repeated until a die is inserted into each pocket.

According to some embodiments, a torque 590 may be applied to the barrel 102 of the die insertion tool 100 during the striking process (see FIG. 5C) to bias the die cavity in the direction that the tip of a working punch is forced during rotational motion of a die table of a rotary press during use. As a die table of a rotary press rotates during use, the centrifugal forces on the upper punch will cause a slight rotation of the punch tip in the direction of rotation of the die table. For example, if the die table rotates in a clockwise direction, then the punch tip may also rotate in a clockwise direction about the longitudinal axis of the punch (which is parallel to the axis of rotation of the die table). Biasing the die cavity in the same direction may ensure that the working punch tip inserts smoothly into the die cavity in use. Accordingly, during the die insertion process the user may apply a torque to the barrel that is in the same direction as the rotation of the die table in use.

For example, for a die table that rotates clockwise when viewed from above, the user may apply a torque in a clockwise direction about a longitudinal axis of the barrel 102. The upper portion 114 of the barrel 102 may include a textured surface, such as a knurled surface, to make it easier for a user to apply the torque to the barrel 102.

Figure 6:
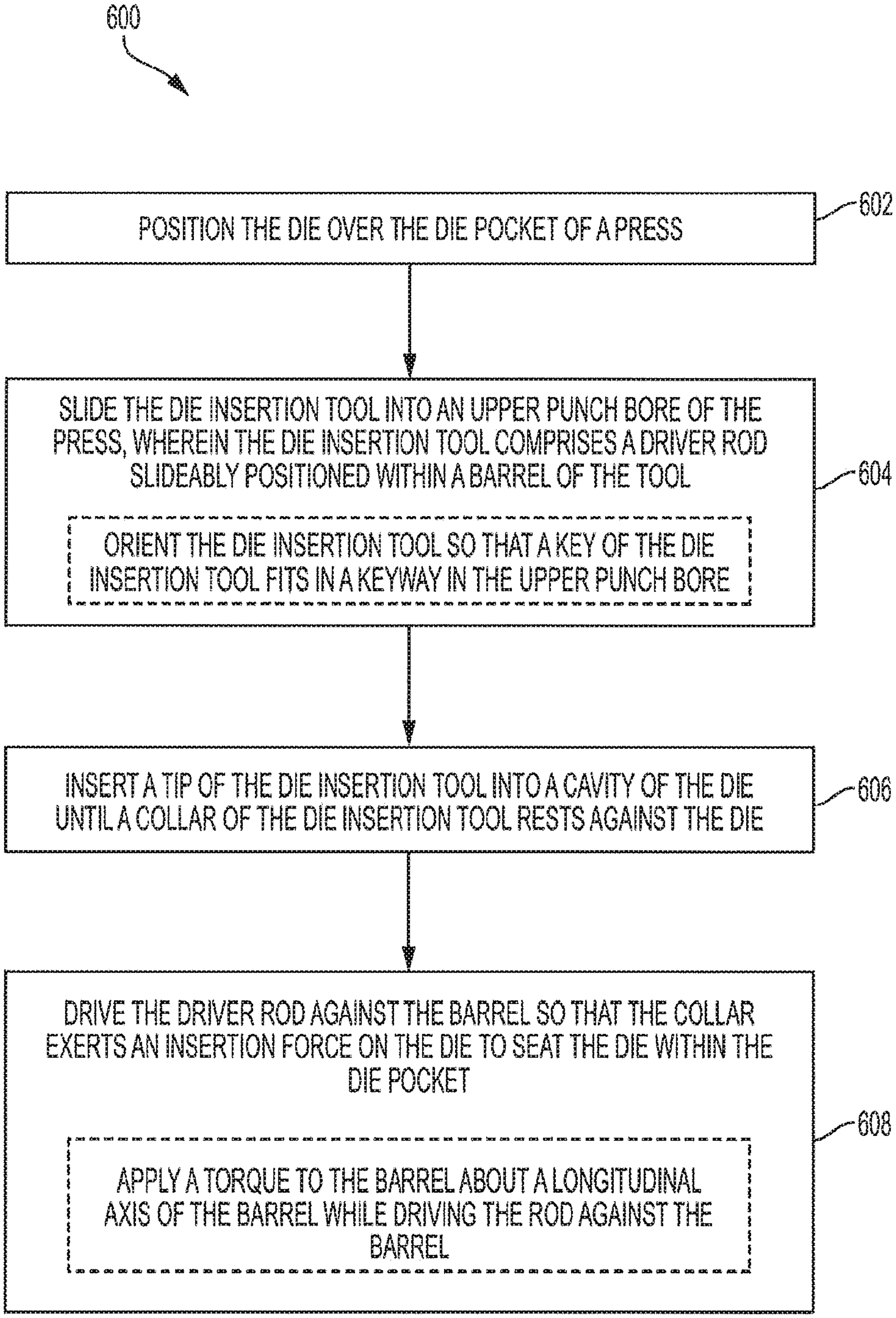
FIG. 6 is a flow chart illustrating a method for inserting a die in a die pocket, according to some embodiments.

FIG. 6 is a flow diagram illustrating a method 600 for inserting a die into a die pocket of a press, according to some embodiments. At step 602, a die is positioned over a die pocket of a press. The press may be a rotary press, such as a rotary tablet press, or may be a single punch press. At step 604, a die insertion tool is inserted into an upper punch bore of the press, as shown, for example in FIG. 5A. The die insertion tool may be inserted such that a key of the tool aligns with and slide into a keyway in the upper punch guide bore to align the tool within the guide bore in the same manner as a working punch.

At step 606, a tip of the die insertion tool is inserted into the die cavity of the die until the collar of the die insertion tool rests against the upper surface of the die, as shown, for example, in FIG. 5B. In this position, the die is properly aligned. For example, the die cavity is properly oriented about a longitudinal axis extending vertically through the punch guide bore such that the tip of a working punch inserted into the punch guide bore can slide freely in and out of the die cavity.

At step 608, the barrel is struck from above so that the collar exerts an insertion force on the die to seat the die within the die pocket. In some embodiments, the barrel is struck using an integrated driving rod that is pulled outward from the barrel, as shown, for example, in FIG. 5C, and struck against the barrel so that the collar exerts an insertion force on the die to seat the die within the die pocket. However, some embodiments of the die insertion tool may not include an integrated driving rod and the barrel may be struck with any other suitable means. For example, the upper end of the barrel may be struck directly with a mallet or a rod may be position against the barrel and the rod may be struck by a mallet. The striking of the barrel may be repeated until the die is seated in the die pocket, for example, as shown in FIG. 5D.

In some embodiments, a torque may be applied to the barrel about the longitudinal axis of the barrel during striking of the driving rod. This may take up clearance between the key and the keyway, which biases the die in the direction of torque application. By applying the torque in the same direction as the rotation of the turret of a rotary press in which the die is inserted, the die cavity may be better aligned with a punch tip during use, since the punch may rotate slightly during use due to centrifugal forces.

Method 600 may be repeated as necessary to insert dies into any additional die pockets. Method 600 may be performed with a die table in-place in the press. For example, an access area of the press may be used to position the die over the die pocket and to withdraw an upper punch from the turret of the press so that the die insertion tool may be inserted in the upper punch guide bore in place of the upper punch for insertion of the die. In some embodiment, method 600 is performed with the die table disassembled from the press. For example, a turret of a rotary press may be removed from the press for die insertion. Dies may then be inserted into the die table of the turret using the die insertion tool, according to method 600. Once the dies are in place, the turret may be reassembled into the press. In some embodiments, prior to removing the turret from the press, the upper and/or lower punches are removed from the turret. The upper and/or lower punches may then be reinserted into the turret once the turret is reassembled into the press.

Figure 7:
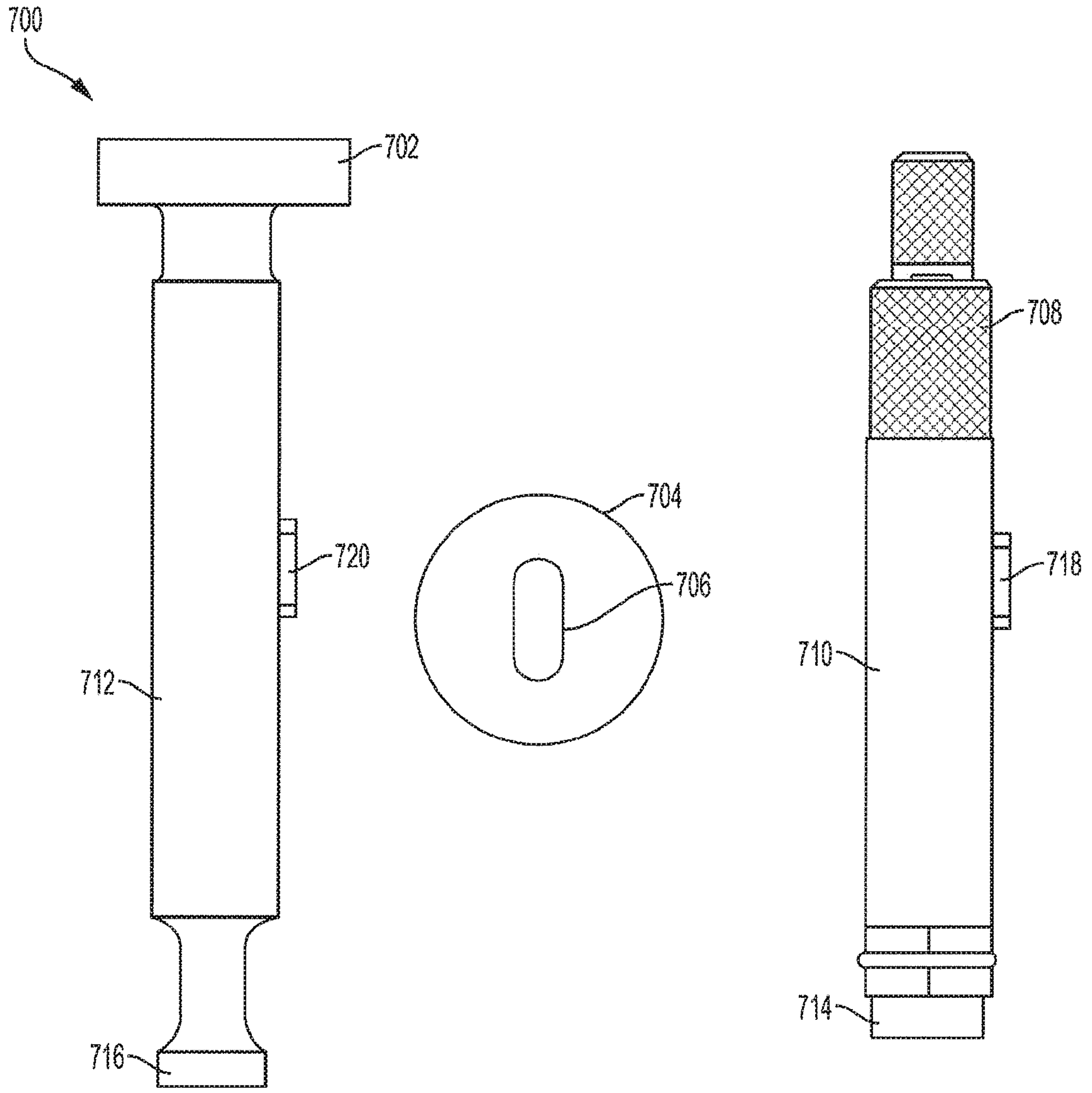
FIG. 7 is a press tooling kit, according to some embodiments.

According to some embodiments, a tooling kit for a press may include a die insertion tool that is configured for use with the tooling. FIG. 7 illustrates an exemplary kit 700 that includes a die insertion tool, according to some embodiments. Kit 700 includes an upper punch 702, a die 704, and a die insertion tool 708. The upper punch 702 is configured for use with the die 704. The barrel 710 of the die insertion tool 708 has a diameter that matches the diameter of the barrel 712 of the upper punch 702, and the profile of the tip 714 of the die insertion tool 708 is shaped in accordance with the profile of the tip 716 of the upper punch 702 to fit into the die cavity 706 of the die 704. The orientation of the key 718 with respect to the tip 714 of the die insertion tool matches the orientation of the key 720 with respect to the tip 716 of the upper punch 702. The matching of the barrel, tip, and key of the die insertion tool to the barrel, tip, and key of the working punch ensures that the die insertion tool 708 inserts the die 704 in the die pocket of a press with the correct alignment for use with the upper punch 702.

In some embodiments, a kit may include at least one die and a die insertion tool with a tip matched to the die. In some embodiments, a kit may also include one or more upper punches and/or one or more lower punches. For example, a kit may include a die, upper and lower punches configured for use with the die, and a die insertion tool configured for use with the die and the press for which the upper and lower punches are configured. In some embodiments, a kit may include a full set of upper and lower punches and dies for a press, such as a rotary press, along with a die insertion tool for inserting the dies in the press.

Figure 8A:
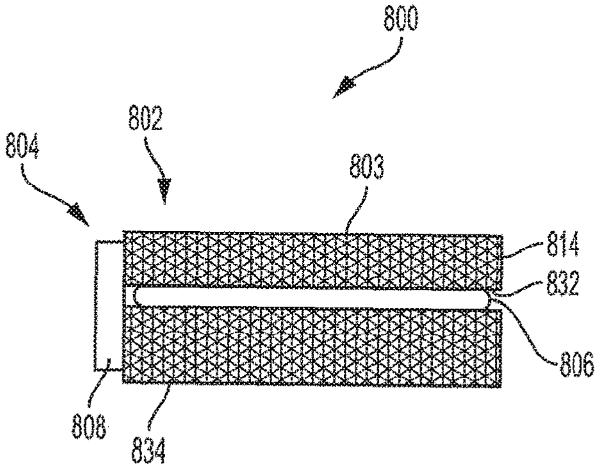
FIGS. 8A-8C illustrate a die insertion ring, according to some embodiments.
Figure 8B:
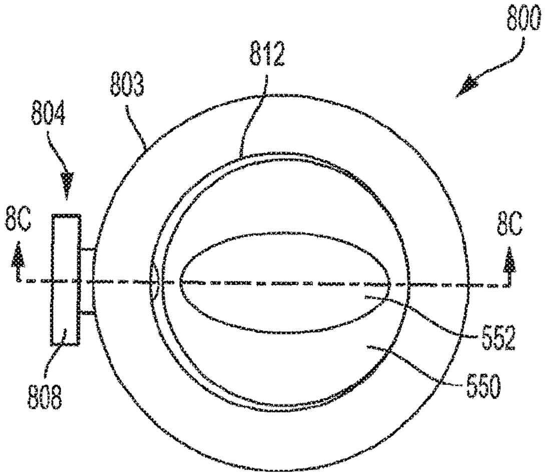
Figure 8C:
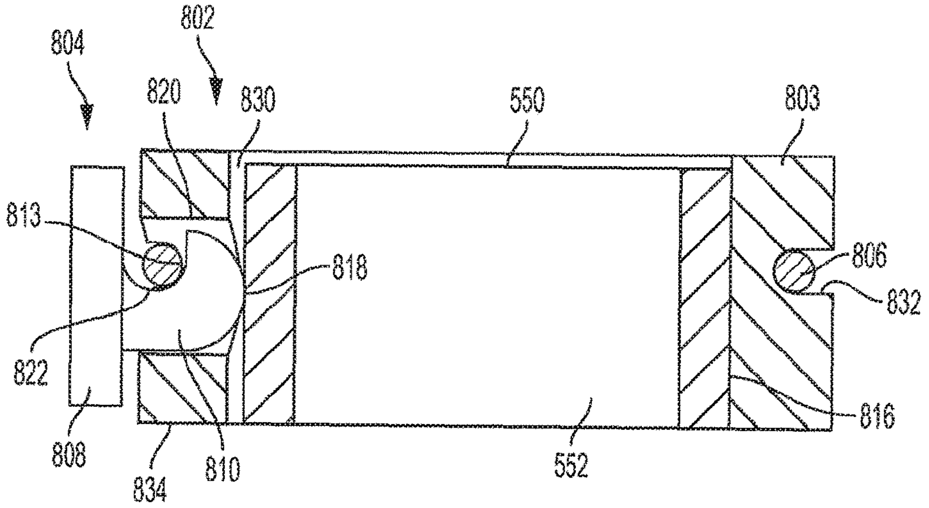

FIGS. 8A-8C illustrate an improved die insertion ring 800. Die insertion ring 800 provides a user with the ability to not only position a die over a die pocket (similarly to die insertion ring 554 in FIGS. 5A-5D) but to also angularly orient the die so that the die cavity is angularly aligned with the die insertion tool. With conventional die insertion rings, a user may not easily rotate the die due to the slip fit with the die insertion ring. Thus, extra time and effort was spent to properly orient the die before the die was positioned over the pocket in a trial and error manner. Die insertion ring 800 improves the die to pocket alignment procedure by providing a manner in which to grip the die with the die insertion tool so that the die can be rotated in position over the pocket.

As described further below, die insertion ring 800 includes a die centering pin 804 for pushing the die up against the inner side of the die insertion ring 800. Through this positive engagement, a user can angularly position the die by simply rotating the die insertion ring 800, which may be useful for orienting a non-cylindrical die cavity for initial alignment with a tip of a die insertion tool (e.g., tip 106 of die insertion tool 100).

FIGS. 8A and 8B are a side and top views, respectively, of die insertion ring 800 with an exemplary die 550 positioned within. FIG. 8C is an enlarged cross sectional view through line A-A in FIG. 8B.

According to some embodiments, die insertion ring 800 includes a main body 802 and a die centering pin 804. Main body 802 may include a ring-shaped wall 803 that has a cylindrical inner surface. The cylindrical inner surface provides a cylindrical central passage 812 for accommodating a die, such as die 550 of FIGS. 5A-5D. The cylindrical inner surface is oriented perpendicularly to the bottom side surface 834 of the main body 802 so that when the die insertion ring 800 is located on a die table, the die is oriented perpendicularly to the die table. The diameter of the cylindrical inner surface of the passage 812 may be selected to provide a clearance between the inner surface and the outer surface of the die so that the die can easily slide into and out of the passage 812. An exemplary clearance 830 is indicated in FIG. 8C.

An outer surface 814 of the main body 802 may be configured for improved gripping, such as by having a knurled surface, a rubberized coating, or a rubber sleeve. The improved gripping can enable a user to more easily rotate the die insertion ring 800 in use.

The main body 802 includes at least one cylindrical bore 820 for receiving the die centering pin 804. The bore 820 may extend through the wall 803 of the main body 802 from the outer surface 814 to the central passage 812. The bore 820 may extend perpendicularly to the longitudinal axis of the cylindrical passage. The main body 802 may include a shoulder 813 that extends inwardly of an outer diameter of the bore 820. In the embodiment illustrated in FIGS. 8A-C, the main body 802 includes an o-ring 806 that extends circumferentially around the wall 803 of the main body 802, and the portion of the o-ring 806 at the bore 820 provides the shoulder 813. The o-ring is just one example of a resilient band that may be used to provide the shoulder. For example, in other embodiments, a ring-shaped spring may be provided. The main body 802 may include a groove 832 that extends circumferentially around the outer surface 814 of the wall 803 for receiving the o-ring 806 or other type of resilient band.

A pin portion 810 of the die centering pin 804 is slidably positioned in the bore 820 in the main body 802 such that the pin portion 810 can slide inward and outward within the bore 820. The die centering pin 804 includes a pressing portion 808 that has a larger diameter than the bore 820 and that is configured for receiving a force, such as a press from a user. The pin portion 810 of the die centering pin 804 may include a recess 822 for receiving a portion of the o-ring 806. As mentioned above, the o-ring 806 serves as the shoulder 813 that extends into the recess 822 for resisting outward motion of the die centering pin 804.

For assembly, the pin portion 810 of the die centering pin 804 is located partially in the bore 820 in the main body 802 with the recess 822 of the die centering pin 804 remaining out of the bore 820. The o-ring 60 is stretched around the outer surface 814 of the main body 802 until it snaps into the groove 832 in the outer surface 814 of the main body and into the recess 822 in the pin portion 810 of the die centering pin 804. As the o-ring 806 snaps into the groove 832, the o-ring 806 may pull the pin portion 810 of the die centering pin 804 further into the bore 820 due to the engagement between the o-ring 806 and the recess 822 of the pin portion 810. Once the o-ring 806 is seated, the die centering pin 804 is captured in the bore 820.

The pressing portion 808 of the die centering pin 804 may serve as a stop for limiting inward movement of the die centering pin 804. When the pressing portion 808 abuts the outer surface 814 of the main body 802, the tip 818 of the pin portion 810 of the die centering pin 804 protrudes inwardly of the surface of the central passage 812 of the main body. With a die positioned in the central passage 812, the pressing portion 808 is spaced from the outer surface 814 of the main body 802 (as illustrated in FIGS. 8B and 8C) so that a pressing force by a user on the pressing portion 808 will be transferred by the tip 818 to the die.

To use the die insertion ring 800 for positioning a die over a die pocket (e.g., positioning die 550 over die pocket 552 of FIGS. 5A-5D), a user slides the die into the central passage 812 of the main body 802 of the die insertion ring 800. As stated above, the central passage 812 is oversized to accommodate the die with some amount of clearance 830. As the die slides into the central passage 812, the die may contact the tip 818 of the die centering pin 804 and push the die centering pin 804 outwardly within the bore 820. The o-ring 806 may act against this outward movement of the die centering pin 804 through the engagement of the o-ring 806 with the wall of the recess 822 of the die centering pin 804. The o-ring 806 may elastically deform as the die centering pin is pushed outwardly resulting in a counteracting inwardly directed force that causes the tip 818 to push against the outer surface of the die. This may push the die against the side 816 of the central passage 812 opposite the die centering pin 804, which "centers" the die in the sense that the die registers in the die insertion ring 800 in a repeatable position. Further, by pushing the die up against the side wall 816, the die is positioned so that its longitudinal axis is parallel with the longitudinal axis of the passage 812. This can ensure that the die is not cocked as it enters the die pocket.

With the die seated within the die insertion ring 800, a user may press the pressing portion 808 of the die centering pin 804 to provide additional force for holding the die against the side 816 of the central passage 812. In doing so, the user is essentially gripping the die and can manipulate the die as needed. The user may slide the die insertion ring 800 across the die table to the appropriate die pocket and, once over the die pocket, may reduce the pressing force applied to the pressing portion 808 to allow the die to slide downwardly somewhat into the die pocket (the die and/or die pocket may be chamfered and/or filleted to allow an initial seating), thus locating the die in the proper planar position. Then, the user may apply additional pressure to the pressing portion to once again grip the die so that the die can be rotated for orienting the die cavity (e.g., die cavity 556) in the correct orientation with respect to the die insertion tool 100. For example, a user may bring the tip 106 of the die insertion tool downward until it reaches the die cavity. If the die cavity is not aligned with the tip 106, the user can then apply pressure to the pressing portion to grip the die and then rotate the die insertion ring 800 to rotate the die until the die cavity aligns with the tip 106.

In some embodiments, the die insertion ring 800 is configured such that the inwardly directed force applied by die centering pin 804 to the die through the elasticity of the o-ring 806 is sufficient to hold the die in the central passage 812 so that the user need not press on the pressing portion during the alignment process. In some embodiments, force provided by the o-ring 806 is sufficient to hold the die against its own weight, and thus, the die can be lifted by lifting the die insertion ring 800. In some embodiments, the die insertion ring 800 is configured so that the die centering pin 804 does not apply a force to the die until the user presses on the pressing portion 808.

In some embodiments, the die insertion ring 800 includes multiple die centering pins 804. For example, two die centering pins 804 located on opposite sides of the main body 802 could be provided.

In alternative embodiments, the die centering pin may be retained within the bore 820 without requiring o-ring 806. For example, in some embodiments, the shoulder 813 is provided by a stepped portion of the bore that engages with a portion of the die centering pin for retention. The pin portion 810 of the die centering pin 804 may be a separate piece from the pressing portion 808 so that the pin portion can be inserted into the bore 820 from the inner side. The bore 820 may be stepped to a smaller diameter (i.e., a stepped portion) providing a shoulder for extending into the recess 822 of the pin portion 810 to serve as a stop for outward movement of the pin portion. Once the pin portion 810 is located in the bore 820, the pressing portion 808 may be threaded onto a thread formed into the end of the pin portion 810. In other embodiments, a head end of the pin portion 810 may include a recess that leads to a threaded portion that is configured to thread into corresponding threads on a stepped portion of the bore. The pin portion 810 is threaded into the stepped portion until the threads on stepped portion clear the threads on the pin portion and enter into the recess at the head end of the pin portion 810. The recess is wide enough to allow the pin portion to slide within the bore.

In other embodiments, one or more detent balls may be captured within the wall 803 and may extend inwardly of the outer diameter of the bore to provide the shoulder 813. In other embodiments, the one or more detent balls are captured in one or more recesses 822 of the pin portion 810 and the detent balls fit into recesses in the wall of the bore that serves as the shoulder 813 for resisting outward sliding of the die centering pin 804. In any other suitable means for retaining a pin within a shaft may be used, such as springs, ball Plungers, push buttons, indexing plungers, spring plungers, hand-retractable spring plungers, side thrust pins, quick release pins, balls and noses, etc.

In some embodiments, the recess 822 may be a circumferential recess and a spring may be located in the recess between the step of the bore 820 and the wall of the recess to provide an inward bias to the die centering pin 804. In other embodiments, a spring is provided between the pressing portion and the outer surface of the main body 802 to provide an outward bias to the die centering pin 804. This may ensure that the tip 818 of the pin portion does not interfere with the sliding of die within the passage 812. The spring can be configured so that the outward bias can be easily overcome by a user's press on the pressing portion.

The main body 802 and die centering pin 804 may be made from any suitable material or materials, including stainless steels, aluminums, engineering plastics, etc. In some embodiments, the die centering pin 804 is made from a softer material than that of the die so as to not mar the die when a user presses on the die centering pin 804.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A die insertion tool for inserting a die into a die pocket of a press, the tool comprising:

a barrel shaped for positioning the tool within a punch guide bore of the press;

a tip for insertion into a die cavity of the die; and a collar located between the barrel and the tip and configured to contact the die when the tip is inserted in the die cavity.

2. The tool of claim 1, wherein the tip is shaped to fit a shape of the die cavity.

3. The tool of claim 1, wherein the barrel is shaped to match a shape of an upper punch that is configured for use with the die.

4. The tool of claim 1, further comprising a key extending from a side of the barrel for rotationally positioning the barrel within the punch bore about a longitudinal axis of the punch bore.

5. The tool of claim 1, wherein the tip has a noncircular profile.

6. The tool of claim 1, wherein the tip is exchangeable.

7. The tool of claim 1, further comprising a driving rod slideably positioned in a bore of the barrel, wherein the driving rod is configured to drive against an end of the bore for applying an insertion force to the die through the collar.

8. The tool of claim 7, wherein the driving rod extends from an end of the barrel when the driving rod contacts the end of the bore.

9. The tool of claim 1, wherein an end portion of an outer surface of the barrel has a rougher texture than an adjacent portion of the outer surface of the barrel.

10. The tool of claim 9, wherein the end portion is knurled.

11. The tool of claim 1, comprising a member that extends into or through a longitudinal slot in the driving rod to retain the driving rod in the bore during use.

12. The tool of claim 11, comprising a key extending from a side of the barrel for rotationally positioning the barrel within the punch bore, wherein the member is configured to affix the key to the barrel.

13. A tool for aligning a die to a die pocket of a press, comprising:

a main body comprising a wall having a cylindrical inner surface that defines a passage for receiving the die, a bore extending through the wall, and a shoulder extending inwardly of an outer diameter of the bore; and a die engaging pin slidably positioned in the bore, the die engaging pin comprising a head portion and a pin portion extending from the head portion, the pin portion having a tip that is configured to push a die against the cylindrical inner surface when the die is located within the passage, wherein an engagement between the head portion and an outer surface of the wall resists inward movement of the die engaging pin in the bore and an engagement between the shoulder of the main body and a recess of the pin portion resists outward movement of the die engaging pin in the bore.

14. The tool of claim 13, wherein the main body comprises a resilient band that extends circumferentially around the wall and the shoulder is a portion of the resilient band.

15. The tool of claim 14, wherein the die engaging pin is biased inwardly by the resilient band when the die is received in the passage.

16. The tool of claim 14, wherein the resilient band is located in a circumferential groove.

17. The tool of claim 13, wherein the tip of the pin portion protrudes into the passage when the head portion abuts the outer surface of the wall.

* * * * *